(12) United States Patent
Kappiah et al.

(10) Patent No.: US 9,332,031 B1
(45) Date of Patent: May 3, 2016

(54) CATEGORIZING ACCOUNTS BASED ON ASSOCIATED IMAGES

(71) Applicant: GOOGLE INC., Mountain View, CA (US)

(72) Inventors: Nandini Kappiah, Los Gatos, CA (US); Andrew Granoff, San Francisco, CA (US); Michael Zhang, Mountain View, CA (US); Jennifer Hope Carter, San Francisco, CA (US); Bharadwaj Subramanian, San Jose, CA (US); Guanggi Ye, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 71 days.

(21) Appl. No.: 13/963,428

(22) Filed: Aug. 9, 2013

(51) Int. Cl.
*G06F 17/40* (2006.01)
*H04L 29/06* (2006.01)

(52) U.S. Cl.
CPC ............ *H04L 63/1483* (2013.01); *G06F 17/40* (2013.01)

(58) Field of Classification Search
CPC ..... G06T 7/0034; G06T 7/0087; G06F 17/40; G06F 21/32; G06F 3/005; G06F 3/002; G06Q 20/4015; G06K 9/46
See application file for complete search history.

(56) References Cited

U.S. PATENT DOCUMENTS

| | | | |
|---|---|---|---|
| 7,130,454 B1 * | 10/2006 | Berube et al. | 382/118 |
| 7,916,976 B1 * | 3/2011 | Kedikian | 382/305 |
| 8,515,971 B2 * | 8/2013 | Beaudet | 707/750 |
| 2013/0133048 A1 * | 5/2013 | Wyn-Harris | 726/5 |
| 2014/0009560 A1 * | 1/2014 | Krishnan et al. | 348/14.03 |
| 2014/0146053 A1 * | 5/2014 | Cragun et al. | 345/467 |

* cited by examiner

*Primary Examiner* — Eleni Shiferaw
*Assistant Examiner* — Paul Callahan
(74) *Attorney, Agent, or Firm* — Procopio, Cory, Hargreaves & Savitch LLP

(57) ABSTRACT

Categorizing accounts based on associated images is described, including identifying information associated with an account associated with a user, the information includes an image associated with the user; producing data associated with the image; computing a threshold value associated with the account based at least on the data associated with the image, the threshold value is associated with a category of accounts; and performing an operation associated with the account based on the threshold value.

20 Claims, 5 Drawing Sheets

CATEGORIZING ACCOUNTS BASED ON ASSOCIATED IMAGES

BACKGROUND

Online users may be exposed to content received from bad actors. For example, a bad actor may provide malicious content, spam, or impersonate another online user. Such bad actors often set up online accounts to conduct such activity.

After the activity has occurred, a bad actor may be detected by detecting the act. However, by this point, some damage may have already been done to other online users.

SUMMARY

The subject matter of the example implementations relates generally to online services and, more particularly, to categorizing accounts based on associated images.

Categorizing accounts based on associated images is described, including identifying information associated with an account associated with a user, the information includes an image associated with the user; producing data associated with the image; computing a threshold value associated with the account based at least on the data associated with the image, the threshold value is associated with a category of accounts; and performing an operation associated with the account based on the threshold value.

In some implementations, the producing the data associated with the image includes producing textual data based on at least a portion of the image.

In some implementations, the data associated with the image includes at least metadata associated with the image.

In some implementations, the producing the data associated with the image includes performing facial recognition on at least a portion of the image to identify a face.

Some implementations include performing clustering of the account with another account based on one or more factors.

In some implementations, the category of accounts includes spam accounts.

In some implementations, the operation includes deactivating the account based on the threshold value.

In some implementations, the information includes profile information and the image includes a profile image.

In some implementations, the identifying information associated with the account associated with the user includes identifying a communication address associated with the account and another account associated with another user.

In some implementations, the threshold value is at least based on detecting that the image is associated with a number of webpages.

In some implementations, the threshold value is at least based on determining that the user follows a number of other users and the number exceeds another threshold value.

According to another aspect, at least one computing device comprising storage and at least one processor are provided, configured for: identifying information associated with an account associated with a user, the information comprising an image associated with the user; producing data associated with the image; computing a threshold value associated with the account based at least on the data associated with the image, the threshold value is associated with a category of accounts; and performing an operation associated with the account based on the threshold value.

According to another aspect, a non-transitory computer readable medium is provided, having stored therein computer executable instructions for receiving and analyzing a profile information and a behavior parameter for an online user account to label indicative of the online user account as suspicious; for the online user account labeled as suspicious, associating at least one other related user account with the online user based on information of the at least one other related user account, and generating a cluster including the online user account and the at least one other related user account associated with the online user account, and analyzing the profile information and the behavior parameter for the cluster including at least one other related user account to label the at least one other related user account as suspicious; and for the online user account labeled as suspicious and the at least one other related user account labeled as suspicious exceeding a threshold value, taking an action against the cluster.

According to yet another aspect, at least one computing device including storage and at least one processor is provided, configured to receive and analyze a profile information and a behavior parameter for an online user account to label indicative of the online user account as suspicious; for the online user account labeled as suspicious, associate at least one other related user account with the online user based on information of the at least one other related user account, and generate a cluster including the online user account and the at least one other related user account associated with the online user account, and analyze the profile information and the behavior parameter for the cluster including at least one other related user account to label the at least one other related user account as suspicious; and for the online user account labeled as suspicious and the at least one other related user account labeled as suspicious exceeding a threshold value, take an action against the cluster.

According to one of the example implementations, the profile information includes image information.

According to another one of the example implementations, the image information is a profile photo.

According to yet another one of the example implementations, the labeling of the at least one other related user account is based on a number of webpages with the profile information, a best guess label for the image, and a likelihood that the image is malicious.

According to still another one of the example implementations, the behavior parameter comprises the online user account following a number of other online users that exceeds a threshold value, or a quantity or acceleration of content posts.

According to a further one of the example implementations, the profile information of the at least one other related user comprises at least one of a sign-up information and a secondary e-mail address.

According to another one of the example implementations, the action comprises terminating the online user account and the at least one other related user account.

DETAILED DESCRIPTION

The subject matter described herein is taught by way of example implementations. Various details have been omitted for the sake of clarity and to avoid obscuring the subject matter. Examples shown below are directed to structures and functions for implementing categorizing accounts based on associated images.

The examples described herein are directed to identifying one or more categories of users and/or accounts (e.g., spammers, bad actors, etc.) pre-emptively, by analysis of profile information that may implicate an account holder as a bad actor. For example, the profile information of multiple accounts may include the same profile picture, include links to the same website, be registered from the same domain and/or within a narrow time window, etc. The profile information of some accounts may reveal the same or similar signup methods (e.g., all of these account creations look like they came from the same user, using the same device, from the same geographical location, etc.).

From the profile information, example implementations may create clusters of accounts to identify accounts associated with, for example, bad actors. Accounts may be grouped or clustered together based on images and/or other data associated with the accounts. In an example, a search-by-image technique (e.g., searching and/or identifying information based on and/or associated with an image) may assist example implementations in deriving additional profile information that may further identify one or more users, based on their profile images, as bad actors. For example, an account of a celebrity impersonator, who uses an image of a celebrity in the account profile, can be detected from performing search by image on the image, which identifies the image is that of the celebrity found on the Internet. If the image is used in the account profile of many accounts, these accounts can be clustered based on the image, and the cluster of accounts can be detected as fake accounts (e.g., accounts set up for malicious purposes).

As described herein, when an account is identified, it implies that the user or actor associated with the account is identified. Similarly, when a user or actor is identified, it implies that an account associated with the user is identified. Bad actors and users exhibiting suspicious usage patterns are only examples used to illustrate the subject matter described herein, which applies to different categories of users and/or accounts.

Figure 1:
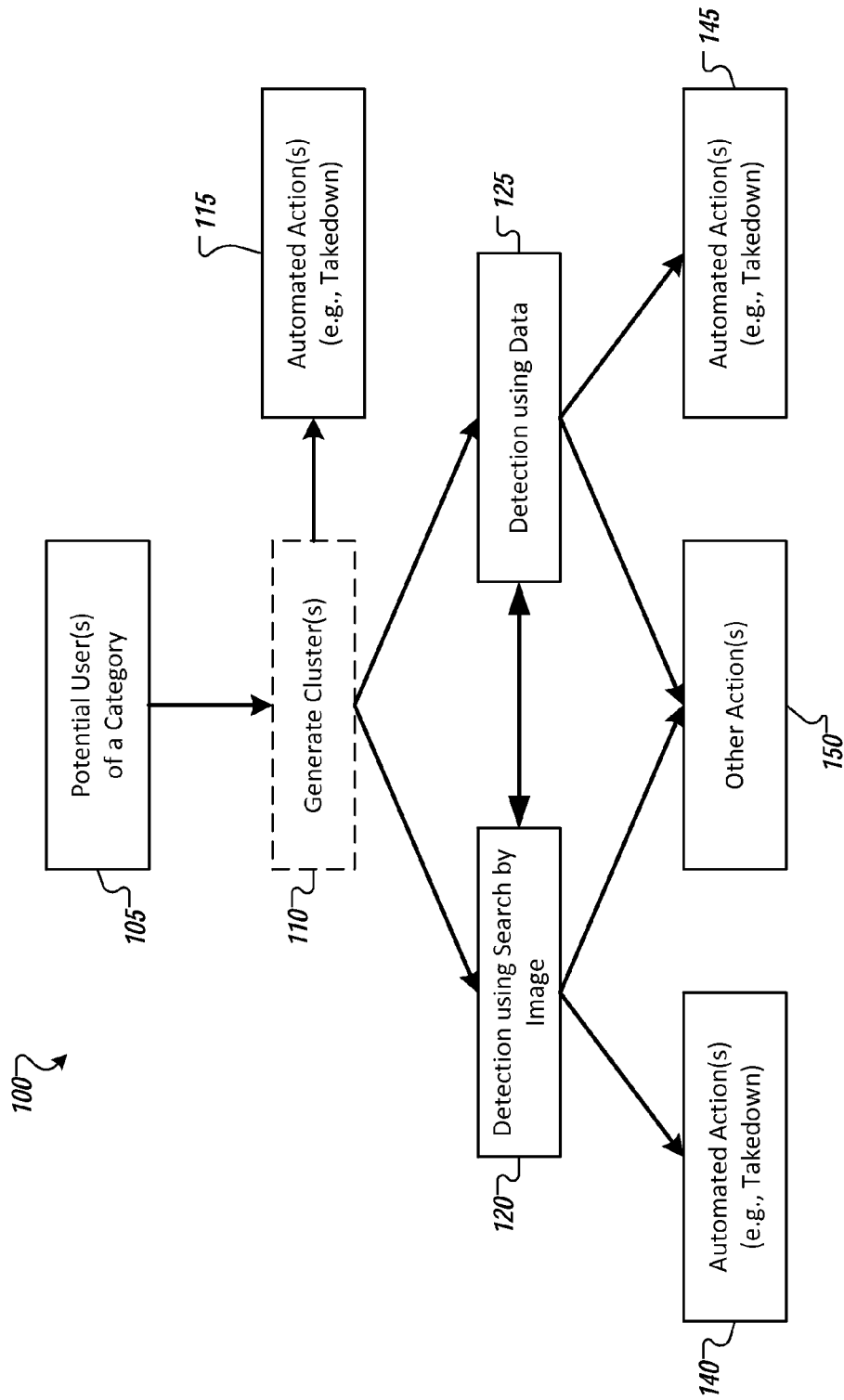
FIG. 1 illustrates an example process pipeline, in accordance with an example implementation.

FIG. 1 illustrates an example process pipeline, in accordance with some example implementations. The pipeline 100 may be used to identify one or more users of a certain category, such as users who are spammers, send out phishing attacks, or in another category of "bad actors," etc. One or more users and/or potential users may be detected, determined, or otherwise identified at block 105 to be users of a certain category (e.g., suspected of being spammers, or bad actors in general).

The users may be identified using any available means based on, for example, their behavior and/or information associated with the users and/or their accounts (e.g., profile information). Such users may be identified by other users. In the category of spammers, for example, other users may identify the spammers or potential spammers by reporting that they have received spam messages. The user (e.g., spammers) may be identified by a system running one or more processes to analyze, for example, communications among users, which detect that some users send messages in quantities much higher than the quantities from average users.

In some example implementations, the identified users may be grouped or clustered with others users to form one or more groups or clusters. A clustering algorithm 110 may be implemented to analyze the signup information of a user (e.g., one identified in 105) and analyze signup information (e.g., profile information) of other accounts to identify that these accounts and the user's account are related. For example, the sign-up information may contain an email address that is the same in the related accounts. The email address may be a secondary email address (e.g., used in unlocking an account, in account recovery or reactivation, etc. when the primary email address is inoperational).

If a cluster of users or accounts is determined to include members of a category (e.g., suspected of being spammers), one or more actions or operations 115 may be taken automatically against one or more of the users in the cluster. In some implementations, a score may be assigned to each user, a subset of users, or the cluster of users. The score can be determined based at least on one or a combination of any profile information and/or activity of the user or associated account. For example, a computation of the score may be based on weighted determinations of a number of clusters that include the user, the behavior of the user, and/or other factors described above.

Then one or more actions or operations 115 may be taken against a user if the user is associated with a score that meets a threshold level (e.g., 80 on a scale of 100). For example, the account associated the user may be taken down, deactivated, freeze, outbound communications (e.g., emails, etc.) may be recalled if possible, the user's profile information may be added to a blacklist, etc.

Users identified in block 105 or, if clustering 110 is implemented; clustered users not filtered or taken out by block 115 will be processed by operations in block 120, block 125, or both. For example, users or clusters of users may be flowing from 105 or 110 to 120 either directly or via 125 (e.g., being processed by the operations of 125 before being processed by the operations of 120). There may be situations where users or clusters of users may be flowing from 105 or 110 to 125 either directly or via 120. In some implementations, the processing flow between 120 and 125 may be more than one time (e.g., 105 or 110 to 125, then to 120, then back to 125, etc.).

In some implementations, one or more images of an account, such as the online profile photo, may be analyzed using, for example, one or more search-by-image techniques 120 or detect using image 120 to determine, identify, or detect a fake user (e.g., a user who provides a name "John" and an image for "Jane"). For example, one or more images provided by a user may be processed or analyzed using, for example, one or more search-by-image techniques to determine, identify, or detect that the same image or images of the same person being used in different accounts. For example, a profile photo of a user may be determined, using one or more search-by-image techniques, that appears on one or more other websites not related to the user (e.g., the photo is that of a popular singer who is not the user).

Examples of search-by-image techniques include any techniques for extracting, searching, and/or producing data associated with or based on an image. In some implementations, if an image is determined to include a face, one or more available facial recognition techniques may be implemented to identify the face or the identity of a user with that face.

In some implementations, character recognition techniques may be performed to detect text embedded in the pixels of an image using one or more available character recognition applications, such as, optical character recognition applications. For example, a character recognition technique may be applied to identify alphanumeric characters on the image and extract the identified characters. Identified characters can be further processed, for example, to eliminate nonsense results generated by the character recognition techniques in an attempt to filter out noise (e.g., non-text features) outputted by the character recognition techniques.

In some implementations, the content of an image may be processed to annotate or describe the image to generate textual data. For example, the word(s) "dog," "a dog," "three puppies" may be produced from an image that includes one or more dogs and/or puppies.

In some implementations, an image may be processed using a grid system to provide relevant textual information to the image. Note that the image may be formatted and stored in any digital format, including but are not limited to: JPEG, GIF, BMP, TIFF, PDF, PS, EMF, MNG, PNG, PSD, SWF and WMF.

The search-by-image (SBI) process partitions the image into tiles of a specific size, and subsequently extracts image features from the tiles. Note that typical image features which can be extracted from these tiles can include, but are not limited to: shapes, colors, and textures. For example, several color features for a given tile in the image can be extracted, wherein the color features can include, but are not limited to: color histograms, a color histogram layout, and color moments. Furthermore, a number of image-processing techniques can be used to extract specific image features, wherein these image-processing techniques can include, but are not limited to: a direct cosine transform (DCT) technique, a principal component analysis (PCA) technique, and a Gabor wavelet technique. In some implementations, the image features can also include orientation histograms.

Also note that the SBI process is not limited to features which are associated with tiles. The SBI process can generally be used with any type of image feature, and is not limited to image features associated with tiles. For example, the present invention can be used with image features which are not associated with tile boundaries, such as attributes of a color histogram for the entire image.

The SBI process then matches the extracted image features against known image features in an image-feature library or database. In some implementations, the known image features in the library were previously obtained using a similar and/or different image extraction techniques. For example, the known image features can be represented by DCT coefficients if a DCT technique is used to extract the image features. In some implementations, matching the extracted image features against the known image features involves matching each extracted image feature to the nearest known image features in the library.

Next, the SBI process combines the matched known-image-features to form image-feature combinations for the image. More specifically, the process generates a set of image-feature combinations for the image partitioned at the specific tile sizes.

In some implementations, operations are repeated iteratively for different tile sizes, wherein the tile sizes can range from only a number of pixels per tile up to a single tile containing the entire image. Specifically, for each tile size, the process partitions the image into tiles of that tile size and then extracts image features from the corresponding tiles. The process then matches extracted image features to the known image features and subsequently uses the known image features to produce a set of image-feature combinations for the image. Hence, the resulting image-feature combinations from step 108 comprise image-feature combinations obtained for different image tile sizes. Note that using different tile sizes facilitates capturing image features on multiple scales. Instead of matching to known image features, the system can alternatively restrict the values of the image features to fall into a limited set of discrete values.

The process next identifies multiple other images which have similar image features and/or image-feature combinations. Specifically, the process searches through a large number of images from various sources. These image sources can include, but are not limited to, images stored in organized image databases, images embedded in webpages on the Internet, images associated with videos on the Internet, or any image that is linked to a web address on the Internet. Note that the difference between images on the Internet and the images in the organized image databases is that the images on the Internet are typically not classified and are typically uncorrelated.

Determining if a particular image includes similar image features to the original image involves processing the particular image in the same manner as the original image to generate image features for the particular image.

While comparing the image features and/or image-feature combinations in the original image with another image, various probability models can be applied. For example, these probability models can include anything from a simple counting technique, which counts the number of similar or identical features, to a complex "multivariate distribution technique," which assumes a multivariate normal distribution of features when comparing two images.

After the multiple similar images are identified, the process obtains text surrounding these images. In some implementations, the text is obtained around the image tag in the HTML file that includes the link to the image. In another embodiment, the text directly surrounding the actual image in a page is obtained. It is assumed that the text found in the vicinity of a given image on the web has high probability being relevant to the content of the image. As a result, the SBI process may use keywords from the text surrounding each identified image as candidate keywords for annotating the original image. Note that some of these candidate keywords may not be relevant to the content of the original image.

The process then expands the set of keywords associated with each identified image by adding synonyms for the set of keywords. In some implementations, intelligent thesaurus tools are used to add synonyms for each keyword in the set. For example, keywords "sea" and "ocean" may appear in two sets of keywords for two identified images, respectively. After expanding the keywords this way, both images will be associated with both keywords.

Next, the process performs comparisons between sets of keywords for those identified images, to identify intersecting keywords. Note that adding synonyms to the keywords increases the probability of identifying such intersections.

Finally, the process takes the intersecting keywords between the multiple identified images, and annotates the original image with the intersecting keywords. Note that the relevance of the intersecting keywords to the original image can be improved by identifying more images having similar features. Because the Internet is an enormously large image database, the probability of finding better matched images increases as more and more images are searched and examined. Furthermore, the intersecting keywords obtained from more images become more accurate as well.

The description above regarding facial recognition, textual recognition, SBI process to detect image content, etc. is provided only as examples. Any techniques to produce data associated with an image may be used. The techniques may be readily available and/or specifically implemented.

In some implementations, metadata of an image may be used separately or in combination with the search by image examples above to produce data associated with an image. For example, an image may include tags as part of its metadata, and the tags may identify that the image is that of person XYZ, taken at location ABC, stored location, etc. Metadata include other information (e.g., locational information) that can be used to analyze an image.

In example implementations, a search-by-image operation on a profile image can identify accounts having potentially suspicious usage. An account, especially a fictitious account, is likely to have an appearance of legitimacy in order for a bad actor to be effective at spreading malicious content such as spams. One critical piece of information that may give an appearance of an online user looking legitimate is including a legitimate-looking profile photo. Bad actors may attempt to address this issue by setting their profile photos of their online accounts to easily identifiable. However, the photos provided by the bad actors are highly certain to be photos of other people (e.g., found on the Internet).

In example implementations, the use of search by image on profile photos provides a process by which it can be determined whether a user is applying an image found online as their profile photo. As a result, detection can be made as to whether the online user is engaged in suspicious usage, even prior to malicious conduct. Thus, the use of static information (e.g., profile information, such as a photo) as opposed to active information of actual bad activity may allow the predictive or proactive action(s) to be taken against potential bad actors and/or bad accounts, instead of reacting after a bad activity has occurred.

In some example implementations, when the detection at 120 reaches a level of confidence (e.g., based on a threshold value), one or more automated actions (e.g., those described with 115 above) may be taken against the detected users or accounts. If that level of confidence has not reached, pipeline 100 may flow to 150 or 125 (e.g., if the 125 operations have not been performed on the users).

Users or cluster of users having suspicious usage may be identified using, for example, non-image data at 125. The data may be profile information, behavior of the users in the online world, and/or other factors, such as suspicious behavior, including but not limited to, following too many other online users, excessive communication volume, and/or frequency or acceleration of posting of content (e.g., posting to V number of members per day, etc.), sending emails in a quantity the give rise to suspicion (e.g., hundreds or thousands of email in a short period of time), conducting outgoing transactions (e.g., comments, blog posts, e-mails, etc.) far exceeding the incoming transactions (e.g., replies, received e-mails, etc.) as measure a ratio of outgoing to incoming transaction greater >T or a number of outgoing transactions >U, etc.).

In some implementations, when the detection at 125 reaches a level of confidence (e.g., based on a threshold value), one or more automated actions (e.g., those described with 115 above) may be taken against the detected users or accounts. If that level of confidence has not reached, pipeline 100 may flow to 150 or 120 (e.g., if the search-by-image operations 120 have not been performed on the users).

Actions or Operations at 150 may be any one or more operations. For example, users or accounts detected (e.g., in 110, 120, and/or 125) may be marked such that they can be identified as already been through the pipeline in subsequent processing by the pipeline. The users or accounts may be routed for further analysis and/or monitor (e.g., by one or more other processes, pipelines, and/or administrators).

Figure 2A:
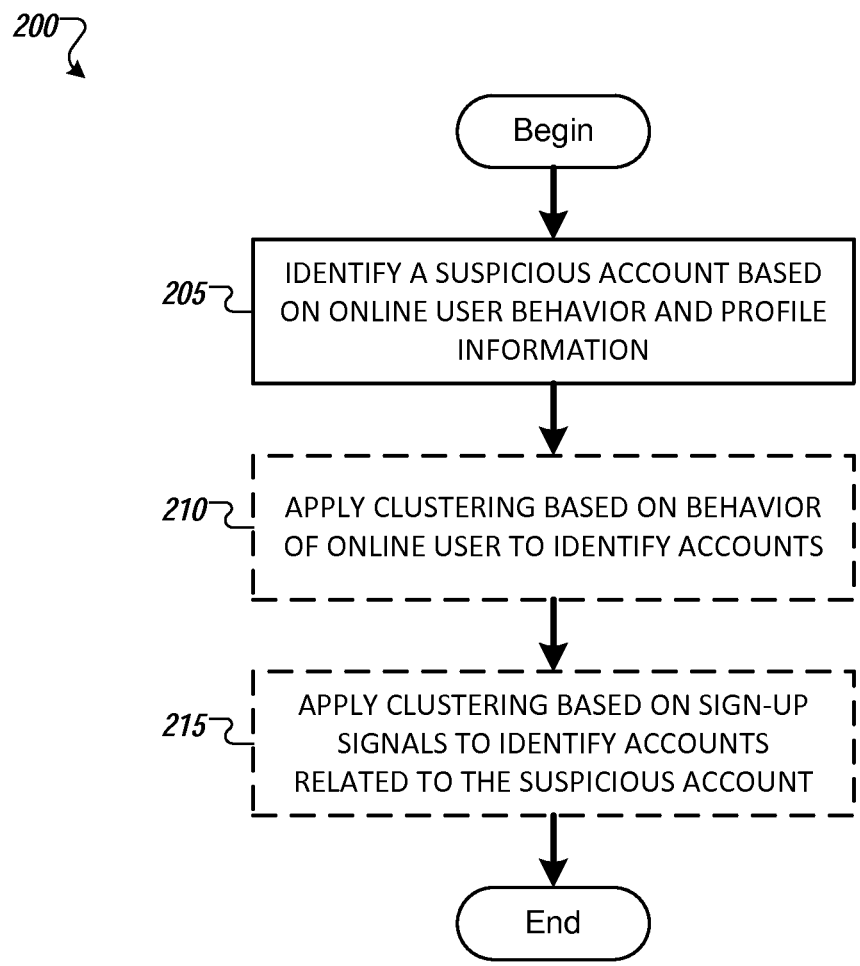
FIG. 2A illustrates an example process flow, in accordance with an example implementation.

FIG. 2A illustrates an example process flow 200, in accordance with an example implementation. Example implementations may first identify an account of a certain type or category based on, for example, online user behavior and profile information at 205. The category may be users or accounts having suspicious usage (e.g., accounts used to initiate spam attacks, send phishing messages, and/or perform other acts to other users that are not welcomed). At 210, example implementations may apply clustering based on, for example, the behavior of the online user to identify accounts that might be suspicious accounts. At 215, which may be performed in conjunction with or as an alternative of block 210, example implementations may apply clustering based on sign-up information (e.g., user profiles) to identify accounts related to the suspicious account.

After identifying an account of a certain type (e.g., suspicious accounts), actions may be taken on the accounts or users associated with the accounts, such as disabling or removing the accounts if the confident level that these accounts are suspicious is high (e.g., meeting a threshold value). If the threshold value is not met, other actions may be taking, such as further process these accounts using additional data, such as images associated with the accounts.

In some examples, process 200 may be implemented with different, fewer, or more blocks. Process 200 may be implemented as computer executable instructions, which can be stored on a medium, loaded onto one or more processors of one or more computing devices, and executed as a computer-implemented method.

Figure 2B:
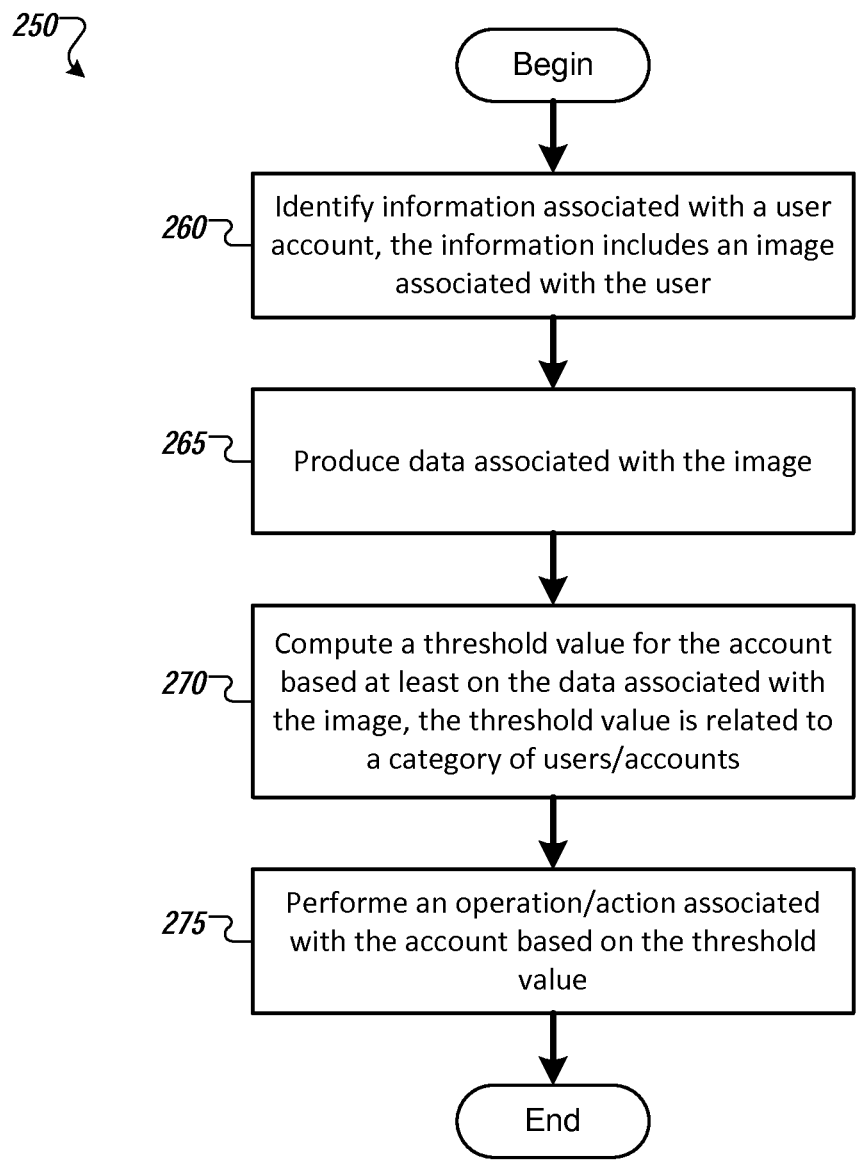
FIG. 2B illustrates another example process flow, in accordance with an example implementation.

FIG. 2B illustrates another example process flow, in accordance with an example implementation. Process 250 is performed to identified users or accounts of a certain category (e.g., spammers, service abusers, policy violators, delinquent payers, or other bad actors, etc.). At block 260, one or more users may be identified from the information associated with the accounts of the users. The information may include images associated with the users or accounts. Optionally, the identified users or account may be clustered with related users or accounts. At block 265, data may be produced using one or more search-by-image techniques as described in 120, FIG. 1, and/or using the techniques as described in 125, FIG. 1. At block 270, a score or threshold value may be computed associated with a user or account based at least on the data associated with the image (e.g., the results from search by image processing). The threshold value is associated with a category of users or accounts. For example, to detect spammers or other users who are very certain not to user their own images with their accounts, the score may be based at least on a number of webpages that include the same or similar images found in their accounts. At 275, one or more actions or operations (e.g., take down or deactivate the accounts) may be performed when the score satisfies a threshold value.

At any point of process 250, if a confident level or threshold value has reached that indicate the category of users or accounts have been identified, one or more actions or operations (e.g., those described above) may be performed.

In some examples, process 250 may be implemented with different, fewer, or more blocks. Process 250 may be implemented as computer executable instructions, which can be stored on a medium, loaded onto one or more processors of one or more computing devices, and executed as a computer-implemented method.

Figure 3:
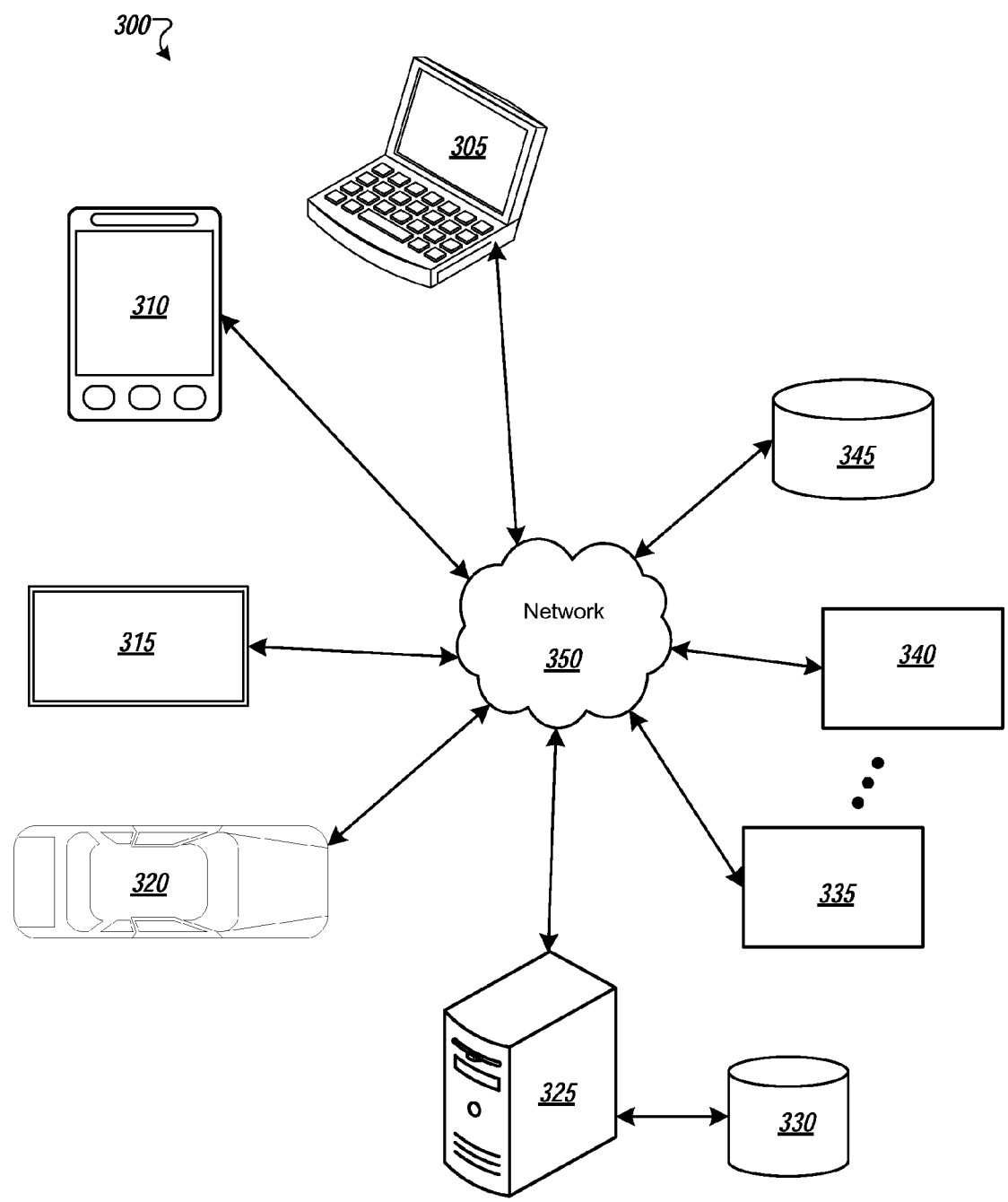
FIG. 3 illustrates an example online environment suitable for some example implementations.

FIG. 3 shows an example online environment in which some example embodiments may be implemented. Environment 300 includes devices 305-345, each is communicatively connected to at least one other device via, for example, network 350. Some devices may be communicatively connected to one or more storage devices 330 and 345 (e.g., via device 305).

Figure 4:
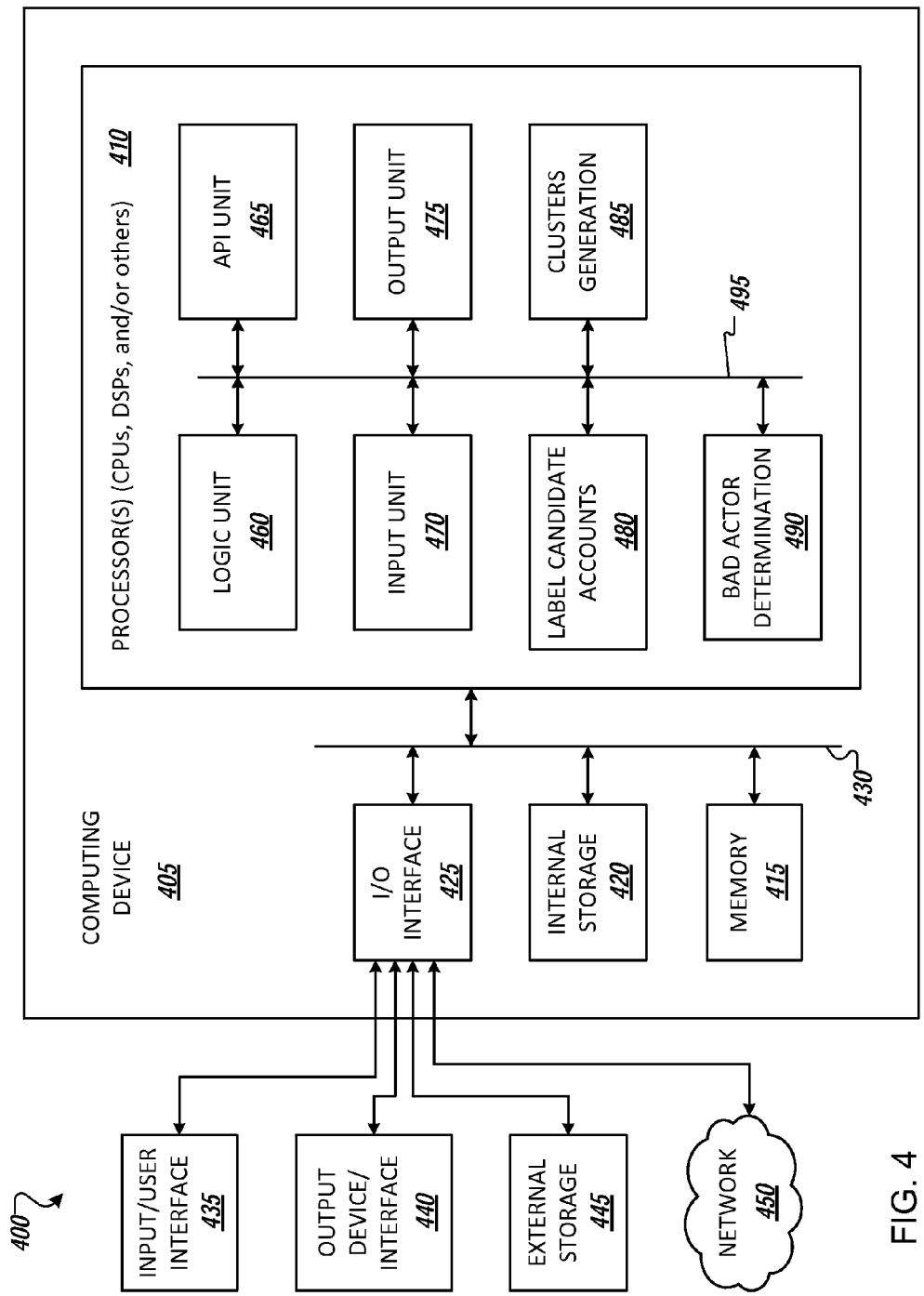
FIG. 4 shows an example computing environment with an example computing device suitable for implementing at least one example implementation.

An example of one or more devices 305-350 may be computing device 405 described in FIG. 4. Devices 305-350 may include, but are not limited to, a computer 325 (e.g., personal or commercial), a device associated with a vehicle 320, a mobile device 310 (e.g., smartphone), a television 315, a mobile computer 305, a server computer 350, computing devices 335-340, storage devices 330, 345. Any of devices 305-350 may access one or more services from and/or provide one or more services to one or more devices shown in environment 400 and/or devices not shown in environment 300.

A user may control a device, as explained above, to implement the example implementations, via network 350. Information associated with the example implementations may be stored at storage device 330 or 345, respectively, for example.

FIG. 4 shows an example computing environment with an example computing device suitable for implementing at least one example implementation. Computing device 405 in computing environment 400 can include one or more processing units, cores, or processors 410, memory 415 (e.g., RAM or ROM), internal storage 420 (e.g., magnetic, optical, or solid state storage), and I/O interface 425, all of which can be coupled on a communication mechanism or bus 430 for communicating information.

Computing device 405 can be communicatively coupled to input/user interface 435 and output device/interface 440. Either one or both of input/user interface 435 and output device/interface 440 can be a wired or wireless interface and can be detachable. Input/user interface 435 may include any device, component, sensor, or interface, physical or virtual that can be used to provide input (e.g., keyboard, a pointing/cursor control, microphone, camera, braille, motion sensor, optical reader, or the like). Output device/interface 440 may include a display, monitor, printer, speaker, braille, or the like. In some example implementations, input/user interface 435 and output device/interface 440 can be embedded with or physically coupled to computing device 405 (e.g., a mobile computing device with buttons or touch-screen input/user interface and an output or printing display, or a television).

Computing device 405 can be communicatively coupled to external storage 445 and network 450 for communicating with any number of networked components, devices, and systems, including one or more computing devices of the same or different configuration. Computing device 405 or any connected computing device can be functioning as, providing services of, or referred to as a server, client, thin server, general machine, special-purpose machine, or by other labels.

I/O interface 425 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 400. Network 450 can be any network or combination of networks (e.g., the Internet, local area network, wide area network, a telephonic network, a cellular network, satellite network, and the like).

Computing device 405 can use and/or communicate using computer-usable or computer-readable media, including transitory media and non-transitory media. Transitory media include transmission media (e.g., metal cables, fiber optics), information, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 405 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 410 can execute under any operating system (OS) (not shown), in a native or virtual environment. To implement a described implementation, one or more applications can be deployed that include logic unit 460, application programming interface (API) unit 465, input unit 470, output unit 475, label candidate accounts unit 480, clusters generation unit 485, bad actor determination unit 490, and inter-unit communication mechanism 495 for the different units to communicate with each other, with the OS, and with other applications (not shown). For example, label candidate accounts unit 480, clusters generation unit 485, bad actor determination unit 490, along with one or more other units, may implement one or more processes shown in FIGS. 1 to 2B. The described units and elements can be varied in design, function, configuration, or implementation and are not limited to the descriptions provided.

In some example implementations, when information or an execution instruction is received by API unit 465, it may be communicated to one or more other units (e.g., logic unit 460, input unit 470, output unit 475, label candidate accounts unit 480, clusters generation unit 485, bad actor determination unit 490). For example, clusters generation unit 485 may manage one or more rules, each of which may include one or more triggering events and/or associated actions. One or more rules, triggering events, and/or actions may be user defined.

The label candidate accounts unit 480 may communicate with the bad action determination unit 490 to label accounts having determined bad actions. Further, the label candidate accounts unit 480 may use API unit 465 to communicate with the clusters generation unit 485 to identify accounts that have been labeled.

In some examples, logic unit 460 may be configured to control the information flow among the units and direct the services provided by API unit 465, input unit 470, output unit 475, label candidate accounts unit 480, clusters generation unit 485, bad actor determination unit 490 in order to implement an implementation described above. For example, the flow of one or more processes or implementations may be controlled by logic unit 460 alone or in conjunction with API unit 465.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method for identifying account image information associated with an online security condition, prior to the occurrence of the online security condition, the method comprising:
   identifying an image associated with an account that is associated with a user to group the account into a cluster of accounts;
   determining data associated with the image to provide an identity of the user associated with the image;
   annotating content of the image to include textual data associated with the image;
   generating one or more keywords based on the textual data associated with the image;
   comparing the one or more keywords based on the textual data to other keywords associated with a known image, and annotating the image associated with the user to include the overlapping keywords; and
   performing an operation associated with the account, based on a comparison between a score of the account determined based on the textual data of the image, and a threshold value.

2. The method of claim 1, wherein the data associated with the image comprises at least metadata associated with the image.

3. The method of claim 1, wherein the determining the data associated with the image comprises performing facial recognition on at least a portion of the image to identify a face.

4. The method of claim 3, wherein the facial recognition is performed by partitioning the image to generate tiles, and determining image features from each of the tiles.

5. The method of claim 4, wherein the image features comprise shapes, colors or textures.

6. The method of claim 4, wherein the determining the image features is performed by one or more of direct cosine transform, principal component analysis, and Gabor wavelet techniques.

7. The method of claim 1, wherein the generating the one or more keywords further comprises adding synonyms of the keywords to the one or more keywords.

8. The method of claim 1, wherein the information comprises profile information and the image comprising a profile image.

9. The method of claim 1, wherein the identifying information associated with the account associated with the user comprises identifying a communication address associated with the account and another account associated with another user.

10. The method of claim 1, wherein the threshold value is at least based on detecting that the image is associated with a number of webpages.

11. The method of claim 1, wherein the threshold value is at least based on determining that the user follows a number of other users and the number exceeds another threshold value.

12. At least one computing device comprising storage and at least one processor for identifying account image information associated with an online security condition, prior to the occurrence of the online security condition, the at least one computing device configured for:
   identifying an image associated with an account that is associated with a user to group the account into a cluster of accounts;
   determining data associated with the image to provide an identity of the user associated with the image;
   annotating content of the image to include textual data associated with the image;
   generating one or more keywords based on the textual data associated with the image;
   comparing the one or more keywords based on the textual data to other keywords associated with a known image, and annotating the image associated with the user to include the overlapping keywords; and
   performing an operation associated with the account based on a comparison between a score of the account determined based on the textual data of the image, and a threshold value.

13. The at least one computing device of claim 12, wherein the determining the data associated with the image comprises producing textual data based on at least a portion of the image.

14. The at least one computing device of claim 12, wherein the category of accounts comprises spam accounts.

15. The at least one computing device of claim 12, wherein the operation comprises deactivating the account based on the threshold value.

16. The at least one computing device of claim 12, wherein the information comprises profile information and the image comprising a profile image.

17. The at least one computing device of claim 12, wherein the threshold value is at least based on detecting that the image is associated with a number of webpages.

18. A non-transitory computer readable medium for identifying account image information associated with an online security condition, prior to the occurrence of the online security condition, the non-transitory computer readable medium having stored therein computer executable instructions for:
   identifying an image associated with an account that is associated with a user to group the account into a cluster of accounts;
   determining data associated with the image to provide an identity of the user associated with the image;
   annotating content of the image to include textual data associated with the image;
   generating one or more keywords based on the textual data associated with the image;
   comparing the one or more keywords based on the textual data to other keywords associated with a known image, and annotating the image associated with the user to include the overlapping keywords; and performing an operation associated with the account based on a comparison between a score of the account determined based on the textual data of the image, and a threshold value.

19. The computer readable medium of claim 18, wherein the category of accounts comprises spam accounts.

20. The computer readable medium of claim 18, wherein the operation comprises deactivating the account based on the threshold value.

\* \* \* \* \*